United States Patent
Tu et al.

(10) Patent No.: US 12,437,461 B2
(45) Date of Patent: Oct. 7, 2025

(54) MACHINE VISION DETECTION METHOD, DETECTION DEVICE THEREOF, AND DETECTION SYSTEM THEREOF

(71) Applicant: CONTEMPORARY AMPEREX TECHNOLOGY (HONG KONG) LIMITED, Hong Kong (CN)

(72) Inventors: Yinhang Tu, Ningde (CN); Kunpeng Cui, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 149 days.

(21) Appl. No.: 18/415,003

(22) Filed: Jan. 17, 2024

(65) Prior Publication Data

US 2024/0153190 A1    May 9, 2024

Related U.S. Application Data

(63) Continuation of application No. PCT/CN2021/134562, filed on Nov. 30, 2021.

(51) Int. Cl.
  *G06T 15/00*    (2011.01)
(52) U.S. Cl.
  CPC .................................. *G06T 15/00* (2013.01)
(58) Field of Classification Search
  CPC ..... G06T 7/0002; G06T 7/0004; G06T 7/001; G06T 7/0006; G06T 15/00; G06T 2200/08; G06T 2207/10028; G06T 7/337; G06T 7/30; G06T 7/60; G06T 7/77; G06T 7/73; G01J 1/0223
See application file for complete search history.

(56) References Cited

U.S. PATENT DOCUMENTS 7,034,272 B1    4/2006    Leonard et al.
2019/0244336 A1  8/2019    Wakisaka et al.

FOREIGN PATENT DOCUMENTS

CN    101131315 A    2/2008
CN    102680494 A    9/2012
(Continued)

OTHER PUBLICATIONS

The European Patent Office (EPO) the Extended European Search Report for Application No. 21965929.9 Jun. 20, 2024 6 Pages.
(Continued)

*Primary Examiner* — Hau H Nguyen
(74) *Attorney, Agent, or Firm* — ANOVA LAW GROUP, PLLC

(57) ABSTRACT

A machine vision detection method includes receiving a three-dimensional image of a part to be detected including a first part and a second part, determining a plurality of sampling positions that satisfy sampling conditions, acquiring first sample data of the three-dimensional image of the first part at sampling positions and second sample data of the three-dimensional image of the second part at the sampling positions, calculating a first height difference between a plurality of first sample data and a second height difference between a plurality of second sample data, calculating a third height difference between the first sample data and the second sample data, and determining that the part to be detected is unqualified when any one of the first height difference, the second height difference, and the third height difference fails to meet a preset detection criterion.

19 Claims, 11 Drawing Sheets

(56) References Cited

FOREIGN PATENT DOCUMENTS

| | | |
|---|---|---|
| CN | 108269302 A | 7/2018 |
| CN | 111637838 A | 9/2020 |
| CN | 111968085 A | 11/2020 |
| CN | 111982924 A | 11/2020 |
| CN | 112326673 A | 2/2021 |
| CN | 112328715 A | 2/2021 |
| CN | 113533341 A | 10/2021 |
| EP | 0172663 A2 | 2/1986 |
| JP | 2005014026 A | 1/2005 |
| JP | 2017151067 A | 8/2017 |
| KR | 20010046986 A | 6/2001 |
| WO | 2021213223 A1 | 10/2021 |

OTHER PUBLICATIONS

The Japan Patent Office (JPO) Decision to Grant a Patent for Application No. 2024-501559 Dec. 9, 2024 6 Pages (including translation).

The World Intellectual Property Organization (WIPO) International Search Report for PCT/CN2021/134562 Jun. 29, 2022 6 pages (including English translation).

State Intellectual Property Office of China The First Office Action for Application No. 202180055230.6 Jul. 31, 2025 21 pages (including translation).

The Korean Intellectual Property Office Written Decision on Registration for Application No. 10-2024-7000690 Jul. 30, 2025 9 Pages (including translation).

MACHINE VISION DETECTION METHOD, DETECTION DEVICE THEREOF, AND DETECTION SYSTEM THEREOF

CROSS-REFERENCE TO RELATED APPLICATION

This application is a continuation of International Application No. PCT/CN2021/134562, filed on Nov. 30, 2021, the entire content of which is incorporated herein by reference.

TECHNICAL FIELD

The present application relates to the field of machine vision, and more particularly to a machine vision detection method, a detection device thereof, and a detection system thereof.

BACKGROUND

Machine vision detection is a technology that uses an image acquisition device and an image processing system to replace manual measurement and judgment. Due to the better efficiency and higher degree of automation compared to manual detection, machine vision detection is widely applied, for example, in surface flatness detection and step height detection of workpieces.

However, the existing machine vision detection solutions are limited by structural design, cost control, matching with actual application scenarios, and other problems, and still have many defects, therefore, the efficiency and detection accuracy both need to be improved.

SUMMARY

In view of the above problems, the present application provides a machine vision detection method, a detection device, and a detection system thereof, which can improve the efficiency and accuracy of machine vision detection.

In a first aspect, the present application provides a machine vision detection method. The machine vision detection method comprises: receiving a three-dimensional image of a part to be detected comprising a first part and a second part; determining a plurality of sampling positions that satisfy sampling conditions; acquiring first sample data of the three-dimensional image of the first part at sampling positions and second sample data of the three-dimensional image of the second part at the sampling positions; calculating a first height difference between a plurality of first sample data and a second height difference between a plurality of second sample data; calculating a third height difference between the first sample data and the second sample data; and determining that the part to be detected is unqualified when any one of the first height difference, the second height difference, and the third height difference fails to meet a preset detection criterion.

In the technical solution of the embodiment of the present application, on the one hand, when detecting the part to be detected, three different height differences are used to determine whether the part to be detected is qualified, which can effectively avoid the risk of laser welding caused by uneven or tilted placement of the first part and the second part. On the other hand, by selecting data at suitable sampling positions in the provided three-dimensional image for analysis, continuous sampling can be supported without stopping at each sampling position, thereby improving the detection speed.

In some embodiments, said determining a plurality of sampling positions that satisfy sampling conditions specifically comprises: setting a plurality of first sampling positions uniformly distributed on the first part; and setting a plurality of second sampling positions uniformly distributed on the second part. Such a sampling position design has better sampling reliability, can make the first, second and third height differences obtained through detection more representative, and can represent the real situation of the two parts.

In some embodiments, the first part comprises: a long side extending along a length direction and a short side extending along a width direction. Said setting a plurality of first sampling positions uniformly distributed on the first part specifically comprises: setting a plurality of first sampling positions that equally divide the long side of the first part.

In the technical solution of the embodiment of the present application, when the first part is in the shape of a strip, uniformly distributed sampling positions can be set on its long side with a longer length to ensure the reliability of the sampling result.

In some embodiments, the first part further comprises: a pair of long sides that are symmetrical along an axis, the axis being parallel to the length direction. The second part is located inside an inner space enclosed by the first part to leave a gap between the first part and the second part. Said setting a plurality of first sampling positions that equally divide the long side of the first part specifically comprises: setting N first sampling positions along each long side, so that the long side of the first part is equally divided into N+1 portions, in which, N is a positive integer. Said setting a plurality of second sampling positions uniformly distributed on the second part specifically comprises: setting corresponding second sampling positions on the second part along the width direction, with a preset distance spaced from the plurality of first sampling positions.

In the technical solution of the embodiment of the present application, when the second part is a strip structure similar to that of the first part and surrounded by the first part, the setting of the second sampling positions can directly refer to first sampling positions that have already set, so as to obtain a more reliable sampling results.

In some embodiments, the method further includes: converting the three-dimensional image into a grayscale image; and generating a coordinate system of the grayscale image according to a position and an inclination angle of the first part in the three-dimensional image. Such a design can generate a suitable coordinate system for the image information, which is convenient for the image processing system to perform subsequent image processing operations.

In some embodiments, a y-axis of the coordinate system is parallel to the long side of the first part, and an x-axis of the coordinate system is parallel to the short side of the first part.

Said setting N first sampling positions along each long side specifically comprises: determining N division points that equally divide the long side of the first part into N+1 portions; taking m as an x-axis coordinate of each of the N first sampling positions; and taking y-axis coordinates of the N division points as y-axis coordinates of the N first sampling positions, respectively, in which, m is a numerical value set according to the size of the first part. Said setting corresponding second sampling positions on the second part along the width direction, with a preset distance spaced from the plurality of first sampling positions specifically comprises: taking n as an x-axis coordinate of each of the N second sampling positions; and taking the y-axis coordinates of the first sampling positions as y-axis coordinates of corresponding second sampling positions, in which, n is a value set according to the size of the second part.

In the technical solution of the embodiment of the present application, based on the previously set coordinate system based on the first part, a method of determining the positions of the first sampling position and the second sampling position in the coordinate system is provided, such that sampling positions uniformly distributed on the first part and the second part can be quickly determined.

In some embodiments, said calculating a third height difference between the first sample data and the second sample data specifically comprises: for each of the plurality of first sampling positions and a corresponding second sampling position, calculating a third height difference between the first sample data and the second sample data; determining a maximum value among a plurality of third height differences; and determining that the third height difference fails to satisfy a preset detection criterion when the maximum value among the plurality of third height differences exceeds a preset threshold. Such a design can ensure that the height difference of the sampling positions can meet the preset detection criterion, so as to well avoid measurement interference and provide more reliable detection results.

In a second aspect, the present application provides a machine vision detection device. The machine vision detection device includes: an image receiving module, configured for receiving a three-dimensional image of a part to be detected comprising a first part and a second part; a sampling module, configured for determining a plurality of sampling positions that satisfy sampling conditions; a data acquisition module, configured for acquiring first sample data of the three-dimensional image of the first part at sampling positions and second sample data of the three-dimensional image of the second part at the sampling positions; a height difference calculation module, configured for calculating a first height difference between a plurality of first sample data, a second height difference between a plurality of second sample data, and a third height difference between the first sample data and the second sample data; and a determination module, configured for determining that the part to be detected is unqualified when any one of the first height difference, the second height difference, and the third height difference fails to meet a preset detection criterion.

In the technical solution of the embodiment of the present application, when detecting the part to be detected, three different height differences are used to determine whether the part to be detected is qualified, which can effectively avoid the missed detection caused by inclined placement of the first part and the second part. Moreover, by selecting data at suitable sampling positions in the provided three-dimensional image for analysis, continuous sampling can be supported without stopping at each sampling position, thereby improving the detection speed.

In some embodiments, the sampling module includes: a first sampling unit, configured for setting a plurality of first sampling positions uniformly distributed on the first part; and a second sampling unit, configured for setting a plurality of second sampling positions uniformly distributed on the second part. Such a sampling position design has better sampling reliability, can make the first, second and third height differences obtained through detection more representative, and can represent the real situation of the two parts.

In some embodiments, the first part comprises: a long side extending along a length direction and a short side extending along a width direction. The first sampling unit is specifically configured for: setting a plurality of first sampling positions that equally divide the long side of the first part.

In the technical solution of the embodiment of the present application, when the first part is in the shape of a strip, uniformly distributed sampling positions can be set on the long side having a longer length to ensure the reliability of the sampling result.

In some embodiments, the first part further includes: a pair of long sides that are symmetrical along an axis, the axis being parallel to the length direction. The second part is located inside an inner space enclosed by the first part to leave a gap between the first part and the second part. The first sampling unit is specifically configured for: setting N first sampling positions along each long side, so that the long side of the first part is equally divided into N+1 portions, where N is a positive integer. The second sampling unit is specifically configured for: setting corresponding second sampling positions on the second part along the width direction, with a preset distance spaced from the plurality of first sampling positions.

In the technical solution of the embodiment of the present application, when the second part is a strip structure similar to that of the first part and surrounded by the first part, the setting of the second sampling positions can directly refer to first sampling positions that have already set, so as to obtain a more reliable sampling results.

In some embodiments, the device further includes: an image preprocessing module, configured for converting the three-dimensional image into a grayscale image; and generating a coordinate system of the grayscale image according to a position and an inclination angle of the first part in the three-dimensional image. Such a design can generate a suitable coordinate system for the image information, which is convenient for the image processing system to perform subsequent image processing operations.

In some embodiments, a y-axis of the coordinate system is parallel to the long side of the first part, and an x-axis of the coordinate system is parallel to the short side of the first part. The first sampling unit is specifically configured for: determining N division points that equally divide the long side of the first part into N+1 portions; taking m as an x-axis coordinate of each of the N first sampling positions; and taking y-axis coordinates of the N division points as y-axis coordinates of the N first sampling positions, respectively, in which, m is a numerical value set according to the size of the first part. The second sampling unit is specifically configured for: taking n as an x-axis coordinate of each of the N second sampling positions; and taking the y-axis coordinates of the first sampling positions as y-axis coordinates of corresponding second sampling positions, in which, n is a value set according to the size of the second part.

In the technical solution of the embodiment of the present application, based on the previously set coordinate system based on the first part, a method of determining the positions of the first sampling position and the second sampling position in the coordinate system is provided, such that sampling positions uniformly distributed on the first part and the second part can be quickly determined.

In some embodiments, the height difference calculation module is specifically configured for: for each of the plurality of first sampling positions and a corresponding second sampling position, calculating a third height difference between the first sample data and the second sample data; and determining a maximum value among a plurality of third height differences. The determination module is specifically configured for: determining that the third height difference fails to satisfy a preset detection criterion when the maximum value among the plurality of third height differences exceeds a preset threshold. Such a design can ensure that the height difference of the sampling positions can meet the preset detection criterion, so as to well avoid measurement interference and provide more reliable detection results.

In a third aspect, the present application provides a machine vision detection system. The machine vision detection system includes: an image acquisition device, configured for acquiring a three-dimensional image of at least a portion of a part to be detected; a detecting station, configured for accommodating the part to be detected; and a first controller, in communication connection with the image acquisition device and configured for executing the above-described machine vision detection method.

In the technical solution of the embodiment of the present application, when detecting the part to be detected, three different height differences are used to determine whether the part to be detected is qualified, which can effectively avoid the missed detection caused by inclined placement of the first part and the second part. Moreover, the part to be detected can be detected in a continuous sampling manner without stopping at each sampling position, thereby improving the detection speed.

In some embodiments, the machine vision detection system further includes: a second controller. The second controller stores a plurality of configuration information recording a target spacing and a target height, with each configuration information corresponding to at least one part to be detected. The image acquisition device comprises: two line laser sensors, a sensor support, a height adjustment module, and a spacing adjustment module. The two line laser sensors are respectively arranged on two sides of the sensor support. The height adjustment module is arranged on the sensor support and configured for adjusting heights of the two line laser sensors. The spacing adjustment module is arranged on the sensor support and configured for adjusting a spacing between the two line laser sensors. The second controller is configured for controlling the height adjustment module and the spacing adjustment module to enable the two line laser sensors to reach the target spacing and/or the target height.

In the technical solution of the embodiment of the present application, additional height adjustment modules and spacing adjustment modules are also provided, so that the machine vision detection system can adapt to the automatic detection of parts to be detected of different models, sizes, or shapes. Moreover, through the configuration information stored in the second controller, the operator can conveniently and quickly switch between different parts to be detected.

In some embodiments, two detecting stations are provided. The image acquisition device further comprises: a moving mechanism, configured for driving the sensor support to reciprocate between the two detecting stations. Such a design enables two detecting stations to share one image acquisition device, improves the utilization efficiency of the image acquisition device, and helps reduce the overall cost of the detection system.

In a fourth aspect, the present application provides an electronic device. The electronic device includes a processor and a memory in communication connection with the processor. The memory stores computer program instructions, which, when being called by the processor, cause the processor to perform the above-described machine vision detection method. Such a design uses three different height differences to determine whether the part to be detected is qualified or not when detecting the part to be detected, which can effectively avoid missed detections caused by the tilted placement of the first part and the second part. Moreover, the part to be detected can be detected in a continuous sampling manner without stopping at each sampling position, thereby improving the detection speed.

In a fifth aspect, the present application provides a non-transitory computer storage medium. The non-transitory computer storage medium stores computer program instructions, which, when being called by the processor, cause the processor to perform the above-described machine vision detection method. Such a design uses three different height differences to determine whether the part to be detected is qualified or not when detecting the part to be detected, which can effectively avoid missed detections caused by the tilted placement of the first part and the second part. Moreover, the part to be detected can be detected in a continuous sampling manner without stopping at each sampling position, thereby improving the detection speed.

The above description is only a summary of the technical solutions of the present application. To make the technical means of the present application better understood and implemented according to the contents of the description, and in order to make the above and other purposes, features and advantages of the present application more obvious and understandable, the specific embodiments of the present application are described in details hereinbelow.

BRIEF DESCRIPTION OF THE DRAWINGS

Upon reading the following detailed description of some embodiments, other advantages and benefits will become apparent to those skilled in the art. The drawings are only for the purpose of illustrating some embodiments and are not to be considered as limiting the application. Moreover, same reference numerals are used to denote the same components throughout the drawings. In the attached figures.

DETAILED DESCRIPTION

Figure 1:
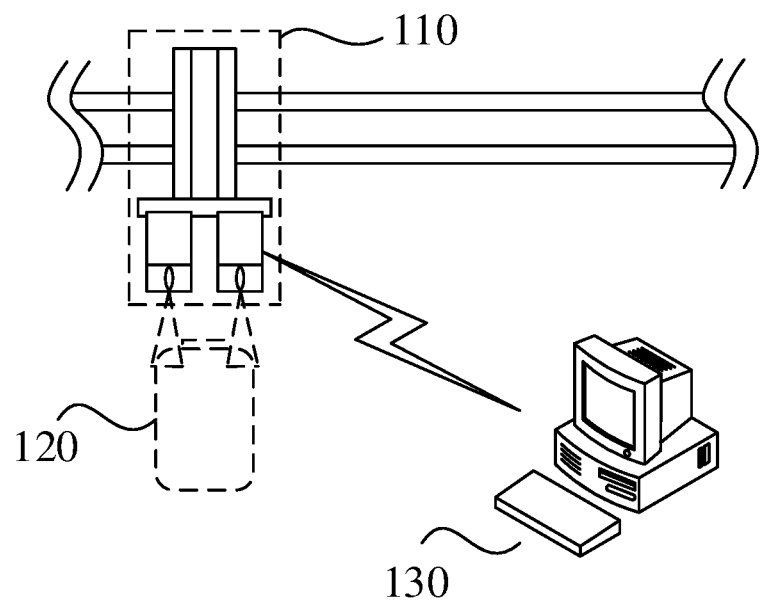
FIG. 1 is a schematic structural diagram of a machine vision detection system according to some embodiments of the present application.

Embodiments of the technical solutions of the present application will be described in detail below in conjunction with the accompanying drawings. The following embodiments are only used to illustrate the technical solution of the present application more clearly, and therefore are only examples, rather than limiting the protection scope of the present application.

Unless otherwise defined, all technical and scientific terms used herein have the same meaning as commonly understood by those skilled in art of the application. The terms used herein are only for the purpose of describing specific embodiments, and are not intended to limit this application. The terms "comprising" and "having" and any variations thereof in the specification, claims, and description of the drawings of the present application are intended to cover a non-exclusive inclusion.

In the description of the embodiments of the present application, technical terms such as "first" and "second" are only used to distinguish different objects, and should not be understood as indicating or implying relative importance or implicitly indicating the number, specific sequence, or primary-secondary relationship. In the description of the embodiments of the present application, "plurality" means two or more, unless otherwise specifically defined.

Reference herein to an "embodiment" means that a particular feature, structure, or characteristic described in connection with an embodiment can be included in at least one embodiment of the present application. The occurrences of this phrase in various places in the specification do not necessarily all referring to the same embodiment, nor referring to separate or alternative embodiments that are mutually exclusive of other embodiments. It is understood explicitly and implicitly by those skilled in the art that the embodiments described herein can be combined with other embodiments.

In the description of the embodiment of the present application, the term "and/or" is only an association relationship describing associated objects, which means that three kinds of relationships can be included, for example, A and/or B may mean the following conditions: A exists alone, both A and B exist at the same time, and B exists alone. In addition, the character "/" in this application generally indicates that the associated objects have an "or" relationship.

In the description of the embodiments of this application, the term "multiple" refers to more than two (including two), similarly, "multiple groups" refers to two or more groups (including two groups), and "multiple pieces" refers to is more than two pieces (including two pieces).

In the description of the embodiments of the present application, the technical terms "center", "longitudinal", "lateral", "length", "width", "thickness", "upper", "lower", "front", "rear", "left", "right", "vertical", "horizontal", "top", "bottom", "inner", "outer", "clockwise", "counter-clockwise", "axial", "radial", "circumferential", and the like indicate the orientation or positional relationship based on the drawing's orientation or positional relationship is only for the convenience of describing the embodiments of the present application and simplifying the description, and does not indicate or imply that the device or element referred to must have a specific orientation, be constructed, or operated in such a specific orientation, and therefore cannot be understood as an limitation to embodiments of the present application.

In the description of the embodiments of this application, unless otherwise clearly specified and limited, technical terms such as "installation", "connection", "attachment", "fixation", and the like should be interpreted in a broad sense, for example, it can be a fixed connection, or a detachable connection, or integration as a while; it can also be a mechanical connection, or an electrical connection; it can be a direct connection, or an indirect connection through a medium, and it can be the internal communication of two components or the interaction relationship between two components. Those skilled in the art can understand the specific meanings of the above terms in embodiments of the present application according to specific situations.

At present, in the production process of lithium battery cells, there is a process called "pre-welding of top cover" to connect the top cover and cell aluminum shell. Before performing the pre-welding of the top cover, it is needed to detect a height difference between the top cover and the aluminum shell, so as to ensure that the height difference between the two workpieces can meet the welding requirements.

A typical machine vision detection method is to control an image acquisition device to move to a plurality of preset sampling positions in sequence to collect image information and perform detection.

The applicant noticed that when the above-mentioned machine vision detection method is adopted, the image acquisition device needs to trigger the movement relative to the workpiece to be detected for multiple times, and the overall action control is complex and time-consuming. Moreover, the detection area of the sampling position is small. When the workpiece to be detected is placed incorrectly, it is easy to miss the detection and cause the failure of the subsequent top cover pre-welding process, which cannot meet the requirements for detection accuracy.

In order to solve the above problems of low efficiency and insufficient detection accuracy in the machine vision detection method, the applicant found from research that: by selecting appropriate sampling position data from the obtained complete image information, the continuous sampling of image acquisition device can be realized and the detection efficiency can be improved. Moreover, by adding the two detection indicators of flatness of the top cover and the aluminum shell, the situation of missed detection can be well avoided and the requirements for detection accuracy can be ensured.

In the following embodiments, for the convenience of description, it is taken the part to be detected in embodiments of the present application being the top cover and the aluminum shell before the top cover pre-welding process as an example for illustration. Of course, those skilled in the art can understand that, based on the same principle and idea, a machine vision detection system of embodiments of the present application can also be applied to other parts to be detected having similar structural shape characteristics for detection.

Referring to FIG. 1, which is a schematic structural diagram of a machine vision detection system according to some embodiments of the present application. The machine vision detection system includes: an image acquisition device 110, a detecting station 120, and a first controller 130.

The image acquisition device 110 is a device configured for acquiring a three-dimensional image signal of the part to be detected. Specifically, any suitable type and quantity of line laser sensors can be selected and used, and a support structure suitable for the line laser sensors can be used.

Figure 2:
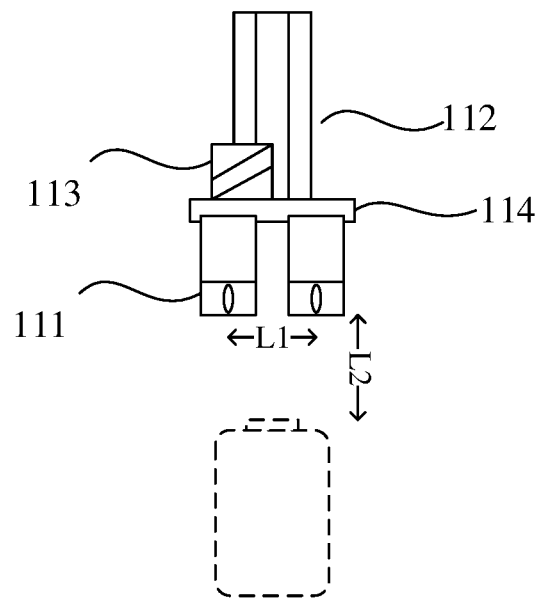
FIG. 2 is a schematic structural diagram of an image acquisition device according to some embodiments of the present application.

In some embodiments, optionally, referring to FIG. 2, the image acquisition device 110 may include: two line laser sensors 111, a sensor support 112, a height adjustment module 113, and a spacing adjustment module 114.

The two line laser sensors 111 are arranged on two sides of the sensor support 112, respectively, and can be used to simultaneously collect three-dimensional image signals of two symmetrical long sides of the cell top cover and the cell aluminum shell. The line laser sensors can have a suitable field of view and pixel accuracy according to the needs of the actual situation.

Both the height adjustment module 113 and the spacing adjustment module 114 are arranged on the sensor support 112, which can be specifically implemented using any suitable type of mechanical structure, including but not limited to screws, cylinders, or gears.

Through the height adjustment module 113 and the spacing adjustment module 114, the heights of the two linear laser sensors 111 and the spacing between the two line laser sensors 111 can be changed within a certain range to meet the detection requirements of different types or sizes of battery cells. In some embodiments, the spacing L1 between the two laser sensors can be adjusted within the range of 20-90 mm. A spacing L2 (also called object distance) between each line laser sensor and the battery cell to be detected can be adjusted within the range of 60±12.5 mm. Such arrangement can meet the needs of battery cells to be detected with different heights and widths.

The detecting station 120 is a spatial position for accommodating a part to be detected, and can be composed of suitable fixtures or other similar mechanisms, which only need to be adapted to the part to be detected. For example, the detecting station 120 may be a specific region arranged on the conveying line.

The first controller 130 may be an electronic computing device having a logic operation function, including but not limited to a server or an industrial computer. It can establish a communication connection with the image acquisition device in a wired or wireless manner, so as to receive the three-dimensional image signal acquired by the image acquisition device.

In operation, the part to be detected at the detecting station 120 (such as that cell top cover and that cell aluminum shell after being pressed-fitted) can be driven by a motor or other suitable type of power device to move relative to the image acquisition device 110 at a set speed. The line laser sensors of the image acquisition device 110 can continuously acquire the three-dimensional image signals of the part to be detected at two long sides thereof through an encoder and other similar sensor devices according to an acquisition frequency adapted to a relative moving speed.

The three-dimensional image signals collected by the line laser sensors are provided to the first controller, then, a series of steps of a machine vision detection method, including the image processing, are performed by the first controller, after that, detect result is output and provided to an external device. Thus, parts to be detected that are unqualified can be screened out in time and dealt with accordingly.

One of the advantages provided by embodiments of the present application is as follows: the image acquisition device can acquire the three-dimensional image signals of the part to be detected in a continuous acquisition manner. Compared with the mode of collecting images after arriving at the target position, such manner can effectively reduce the frequency of start and stop actions, thereby greatly improving the detection speed.

Figure 3:
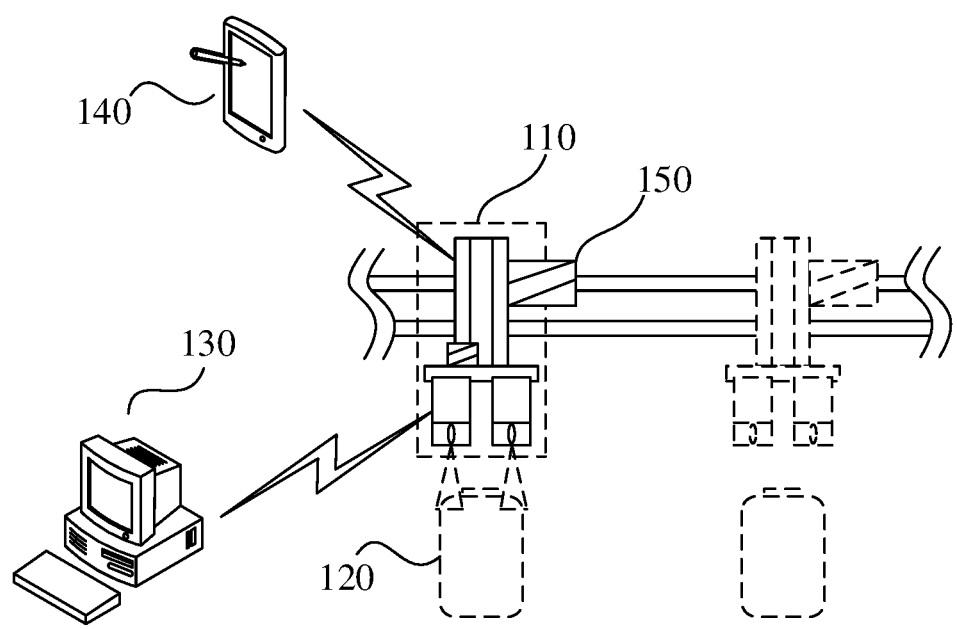
FIG. 3 is a schematic structural diagram of a machine vision detection system according to other embodiments of the present application.

According to some embodiments of the present application, optionally referring to FIG. 3, which is a schematic structural diagram of a machine vision detection system provided by other embodiments of the present application. The machine vision detection system may further include a second controller 140.

The second controller 140 stores a plurality of configuration information recording a target spacing and a target height. The configuration information is data information corresponding to the part to be detected, and can be preset by technicians according to actual production conditions.

In operation, when the parts to be detected entering the machine vision detection system change, technicians or operators can choose to determine the configuration information corresponding to the parts to be detected that need to be detected at present, and then the second controller automatically control the height adjustment module 113 and the spacing adjustment module 114 to move the line laser sensors to the target spacing and target height recorded in the configuration information, according to the selected configuration information, so as to complete the three-dimensional image signal acquisition of the part to be detected.

It should be noted that, for the convenience of description, in embodiments of the present application, the "first controller" and the "second controller" are defined for description according to different functions to be performed by the controllers. Those skilled in the art can understand that the description of the first controller and the second controller is not intended to limit the specific implementation of the controllers, but may be different functional modules in the same electronic computing device, or may be separate functional modules arranged in different electronic computing devices.

One of the advantages provided by embodiments of the present application is as follows: through the pre-stored configuration information, the operator can simply and quickly adjust the machine vision detection system when the part to be detected changes (such as when the size of the battery cell to be detected changes), so as to adapt the system to the charged part to be detected, thereby effectively improving the detection efficiency and compatibility.

In some embodiments, optionally, continuing referring to FIG. 3, the machine vision detection system is provided with two detecting stations 120 and an additional moving mechanism 150.

The moving mechanism 150 is a power mechanism configured for driving the image acquisition device 110 to reciprocate between different detecting stations 120, and can adopt any suitable type of power device, including but not limited to a cylinder, a motor, or a spring, as long as the use requirements can be satisfied.

The two different detecting stations 120 may be arranged in any suitable form, such as the side-by-side arrangement shown in FIG. 3. Compatible with the arrangement of the detecting stations 120, the moving mechanism 150 may include guide rails straddling between the two detecting stations 120, and the image acquisition device 110 is driven to reciprocate along the guide rails by the power device, such as the motor, the cylinder, or the spring.

In operation, the machine vision detection system may first collect image signals of the part to be detected at the detecting station 120 on the left. After the image signals have been collected, the moving mechanism drives the image acquisition device 110 to move to the detecting station 120 on the right to collect image signals of another part to be detected. At this time, a next part to be detected enters the detecting station 120 on the left.

After the image acquisition device 110 collects the image signals of the part to be detected located at the detecting station 120 on the right, the moving mechanism drives the image acquisition device 110 back to the position of the detecting station 120 on the left to continue collecting image signals. At this time, a next part to be detected enters the detecting station 120 on the right.

By repeating the above steps, the image acquisition device 120 can alternately complete the acquisition of three-dimensional image signals of the parts to be detected at the two detecting stations.

One of the advantages provided by embodiments of the present application is as follows: through the additionally provided moving mechanism, two detecting stations can share a single image acquisition device, and image signal acquisition can be performed alternately. As a result, the utilization efficiency of the image acquisition device and the detection efficiency of the machine vision detection system are improved.

It should be noted that, in embodiments of the present application, two detecting stations 120 are taken as an example for description. Those skilled in the art can understand that more detecting stations 120 can also be configured according to the needs of the actual situation, and adaptive adjustments and changes may be made to the moving mechanism.

Figure 4:
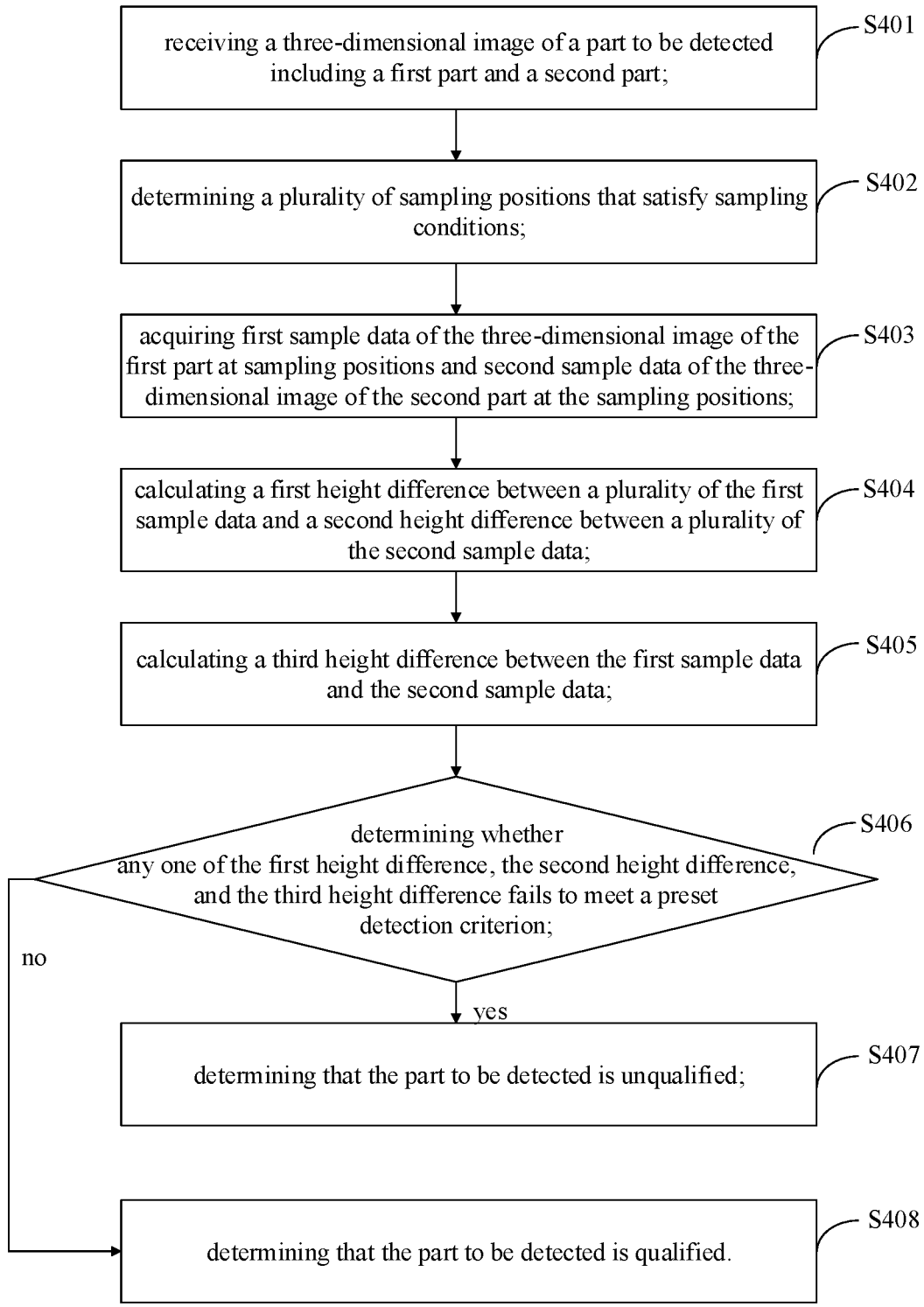
FIG. 4 is a method flowchart of a machine vision detection method according to some embodiments of the present application.

According to some embodiments of the present application, FIG. 4 is a machine vision detection method of some embodiments of the present application. The machine vision detection method can be executed by the above first controller. Referring to FIG. 4, the machine vision detection method includes the following steps:

In step S401, a three-dimensional image of a part to be detected including a first part and a second part is received.

Herein, the part to be detected refers to a workpiece that has entered the detecting station and is waiting to be detected. In this embodiment, the part to be detected includes a first part and a second part. The three-dimensional image is specifically determined by a shooting area of the image acquisition device. Only portions of the first part and the second part can be shoot, or alternatively all of the part to be detected can be shoot, as long as the detect requirement is satisfied, which is not limited herein.

In step S402, a plurality of sampling positions that satisfy sampling conditions are determined.

The sampling positions are positions selected according to preset sampling conditions. The sampling conditions can be set by technicians according to the needs of the actual situation, so as to make the selected sampling positions as representative as possible and improve the accuracy of detection. The number of sampling positions can be determined according to actual needs (such as a size of the part to be detected), and is not limited here.

In step S403, first sample data of the three-dimensional image of the first part at sampling positions and second sample data of the three-dimensional image of the second part at the sampling positions are acquired.

Herein, "sample data" respectively refer to three-dimensional data information located at specific sampling positions, for example, height information of the sampling positions. In this embodiment, for the convenience of description, terms such as "first sample data" and "second sample data" are used to distinguish the data information located in the first part and the second part. In the subsequent calculation process, only the sample data, rather than all the signals of the three-dimensional image acquired, are to be processed.

In step S404, a first height difference between a plurality of the first sample data and a second height difference between a plurality of the second sample data are calculated.

The "first height difference" is obtained through calculation of the first sample data, and is used to represent the height difference between different positions of the first part. Correspondingly, the "second height difference" is obtained through calculation of the second sample data, and is used to represent the height difference between different positions of the second part.

Those skilled in the art can understand that in the case where the surfaces of the first part and the second part are relatively flat (for example, an aluminum shell and a top cover of a lithium-ion battery), a height difference between different positions of the first part and a height difference between different positions of the second part should be in a smaller range.

In step S405, a third height difference between the first sample data and the second sample data is calculated.

The "third height difference" is data that is calculated from the first sample data and the second sample data, used to represent the height difference between the first part and the second part, and is a main detection item in the machine vision detection method.

In step S406, it is determined whether any one of the first height difference, the second height difference, or the third height difference fails to meet a preset detection criterion. If it does, step S407 is executed; if it does not, step S408 is executed.

The preset detection criterion can be set by the technicians according to the needs of the actual situation (such as process requirements, on-site production experience). In some embodiments, the detection criterion may consist of a series of judgment criteria or thresholds. For example, the first height difference and the second height difference may have the same or different difference thresholds to help determine whether the first part and the second part have surface slope problems. The third height difference is set with a different height threshold to help determine whether the step between the first part and the second part is too high.

In step S407, it is determined that the part to be detected is unqualified.

When the calculated first height difference or second height difference exceeds the corresponding threshold and fails to meet the detection criterion, it is usually indicated that the first part or the second part is placed unevenly or tilted. In such condition, it can be determined that the part to be detected is unqualified. If the calculated third height difference exceeds the corresponding threshold and fails to meet the detection criterion, it is indicated that the height difference between the first part and the second part is too large to meet the process requirements, and thus, the part to be detected can also be determined as a failure.

In step S408, it is determined that the part to be detected is qualified.

When all the three detect items, namely, the first height difference, the second height difference, and the third height difference can all meet the preset detect criteria, it can be determined that the part to be detected is qualified and will not negatively affect the subsequent process (e.g. pre-soldering of the top cover).

One of the advantages provided by embodiments of the present application is as follows: when detecting the part to be detected, three different height differences are used to determine whether the part to be detected is qualified, which can effectively avoid the missed detection caused by inclined placement of the first part and the second part.

In some embodiments, optionally, the step S402 of selecting sampling positions specifically includes: setting a plurality of first sampling positions uniformly distributed on the first part and a plurality of second sampling positions uniformly distributed on the second part.

Herein, "uniformly distributed" means that the sampling positions are uniformly distributed on the first part and the second part. The specific setting may be determined by actual conditions, such as the shapes and sizes of the first part and the second part, and the number of the sampling positions.

In this way, the sampling positions set according to the uniform distribution have better representativeness, which can ensure that the sample data more truly reflect the actual conditions of the first part and the second part, and improve detection accuracy.

In some embodiments, optionally, when the first part has a long strip structure (such as a flat cell aluminum shell), including long sides extending along the length direction and short sides extending along the width direction, the step of providing the sampling positions in the first part may specifically include: setting a plurality of first sampling positions that equally divide the long side of the first part.

When the first part is in a shape extending a long length along the axis direction (such as a long rectangle or a long cylinder), the change of the height information in the length direction is the main detection target. The slight inclination of the first part is mainly reflected in the change of height information in the length direction. Therefore, the uniform distribution of the first sampling positions along the long side extending in the length direction can better present the real situation of the first part through the sample data.

Figure 5:
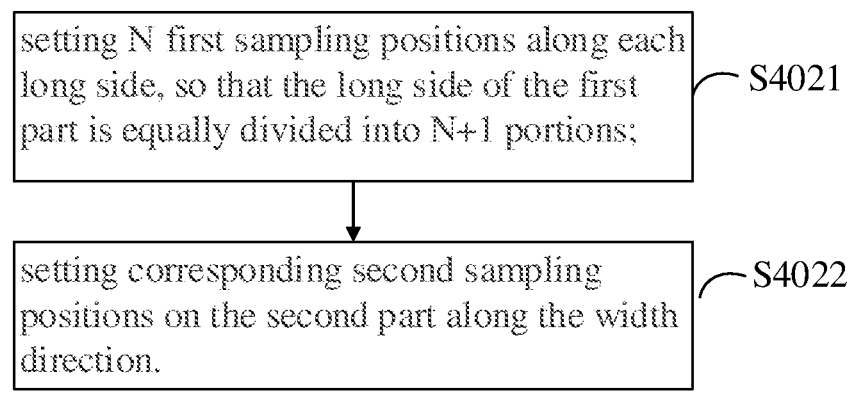
FIG. 5 is a method flowchart of a step of sampling positions according to some embodiments of the present application.

In some embodiments, optionally, in the case where the first part exhibits a symmetrical structure along the axis (that is, includes a pair of long sides that are symmetrical along an axis parallel to the length direction), and the second part is located inside an inner space enclosed by the first part to leave a gap between the first part and the second part (such as the cell top cover and the cell aluminum shell surrounding the cell top cover), referring to FIG. 5, the first sampling positions and the second sampling positions can be set according to the following steps:

In step S4021, N first sampling positions are set along each long side, so that the long side of the first part is equally divided into N+1 portions.

Herein, N is a positive integer, which can be specifically set by technicians according to actual needs, for example, N can be set to 4. In this embodiment, the sampling positions are set according to the length of the long side, and the spacing between adjacent sampling positions is equal, so that the long side is evenly divided.

In step S4022, corresponding second sampling positions are set on the second part along the width direction, with a preset distance spaced from the plurality of first sampling positions.

The second part is a part surrounded by the first part, and both the first and second parts have similar outlines. Thus, the second sampling positions can be set with reference to the first sampling positions, in which, the first sampling positions are directly taken as the starting points, and the second sampling positions can be determined after extending a certain distance from the respective first sampling positions until reaching the second part.

The "preset distance" can be determined by the spacing between the first part and the second part, as long as such preset distance can ensure that the second sampling positions can be located in the region where the second part is located.

One of the advantages of embodiments of the present application is as follows: the setting of the second sampling positions can directly refer to first sampling positions that have already set. Such arrangement manner of the sampling positions helps to obtain a more reliable calculation result of the third height difference.

Figure 6:
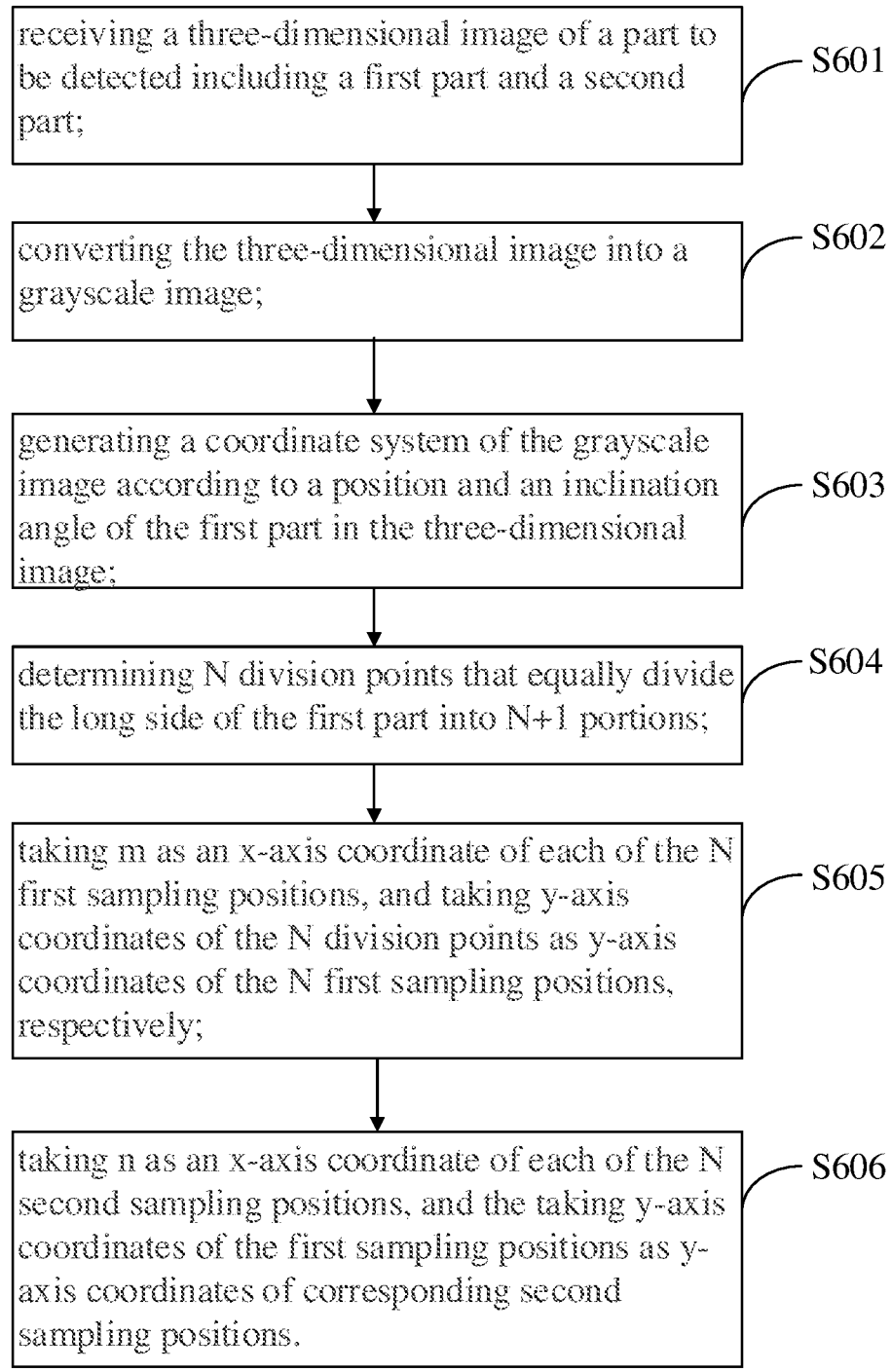
FIG. 6 is a method flowchart of a machine vision detection method according to other embodiments of the present application.

In some embodiments, optionally, referring to FIG. 6, which is a flowchart of a machine vision detection method provided by other embodiments of the present application. The machine vision detection method may include the following steps:

In step S601, a three-dimensional image of a part to be detected including a first part and a second part is received.

Step S601 is similar to step S401, which is to receive the three-dimensional image signals after the image acquisition device moves continuously relative to the part to be detected.

In step S602, the three-dimensional image is converted into a grayscale image.

The three-dimensional images collected by the line laser sensors are some color images marked with height information. In order to facilitate subsequent processing operations, an appropriate type of pixel conversion method can be used to convert the three-dimensional images into corresponding grayscale images.

In step S603, a coordinate system of the grayscale image is generated according to a position and an inclination angle of the first part in the three-dimensional image.

The "coordinate system" refers to a reference standard used to represent position information in the grayscale image, and can be established by specifying an origin position of the coordinate system and positions of the coordinate axes. Affected by one or more factors of the actual situation, the part to be detected may be in a tilted state in the three-dimensional image. The tilted state of the part to be detected in the image can be corrected by establishing the coordinate system reasonably, so as to simplify the position coordinates of the sampling positions and the subsequent height calculation process.

In some embodiments, optionally, a y-axis of the coordinate system established in step S603 is parallel to the long side of the first part, and an x-axis of the coordinate system is parallel to the short side of the first part. Continuing referring to FIG. 6, in the case where such a coordinate system has been established, the method for providing the first sampling positions and the second sampling positions may include the following steps:

In step S604, N division points that equally divide the long side of the first part into N+1 portions are determined.

In the coordinate system, the coordinate positions of the two ends of the long side of the first part can be conveniently determined. Thus, the position coordinates corresponding to the N division points that equally divide the long side are calculated.

In step S605, m is taken as an x-axis coordinate of each of the N first sampling positions, and y-axis coordinates of the N division points are taken as y-axis coordinates of the N first sampling positions, respectively.

Herein, m is a numerical value set by technicians according to the size of the first part. As described in the above, the y-axis and the x-axis of the coordinate system are respectively parallel to the long side and the short side of the first part. Therefore, the x-axis coordinates of the N first sampling positions on a same straight line should be the same, and by setting the value of m, technicians can set the value of m as long as the first sampling positions are kept within the range of the first part.

While the y-axis coordinates of the first sampling positions are determined by the division points, so as to ensure that the N sampling positions are uniformly distributed along the long side of the first part.

In step S606, n is taken as an x-axis coordinate of each of the N second sampling positions, and the y-axis coordinates of the first sampling positions are taken as y-axis coordinates of corresponding second sampling positions.

Herein, n is a value set by technicians according to the size of the second part. As described in the above, the second part has an outline and a positional relationship that are similar to the first part. That is, the y-axis and the x-axis of the coordinate system are actually parallel to the long side and the short side of the second part, respectively. Thus, the y-axis coordinates of the second sampling positions can refer to the corresponding first sampling positions, and the technicians can keep the second sampling position within the range of the second part by setting the value of n.

One of the advantages of embodiments of the present application is as follows: a method for determining the positions of the first sampling position and the second sampling position in the coordinate system is provided, which and can quickly determine the sampling positions uniformly distributed among the first part and the second part.

Figure 7:
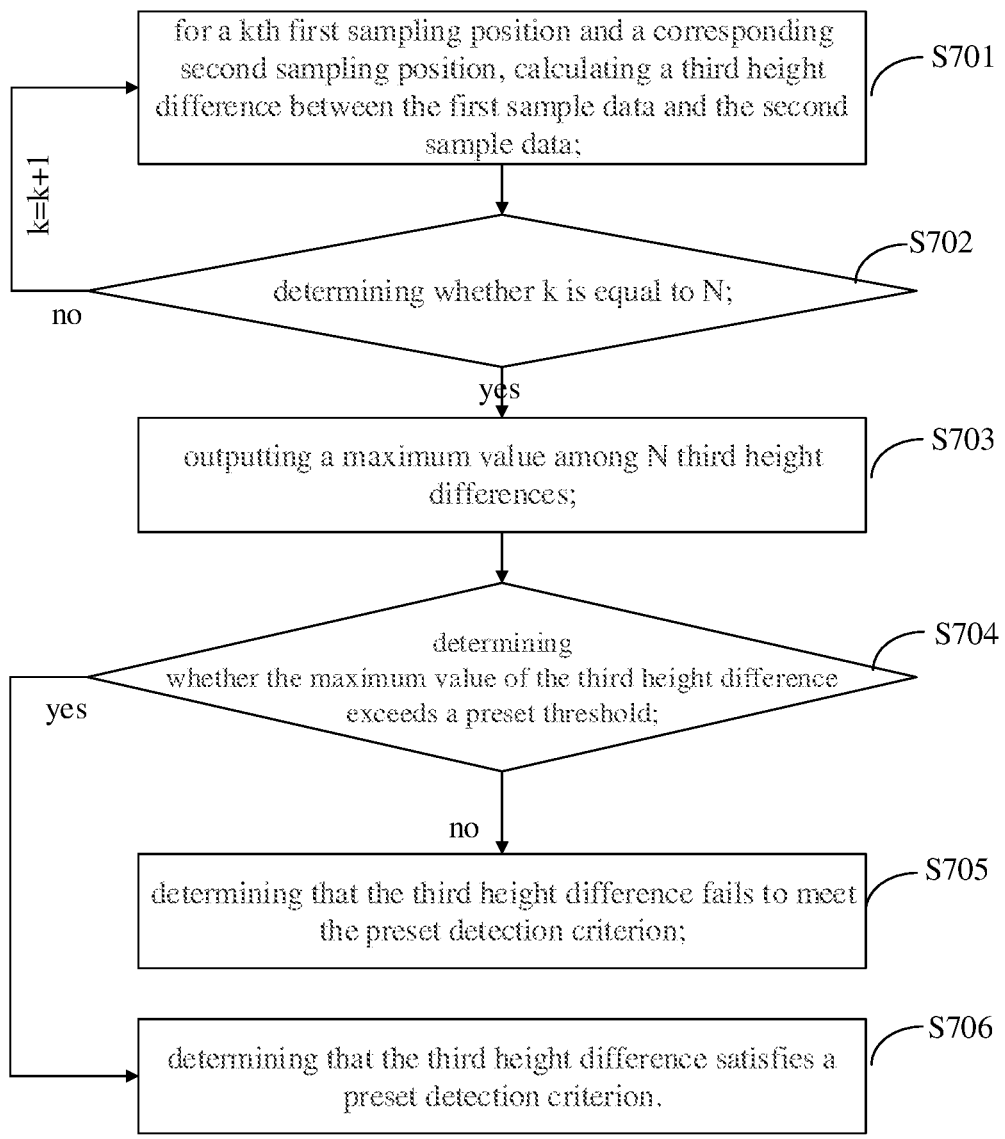
FIG. 7 is a schematic diagram of determining whether height differences satisfy the preset criteria according to some embodiments of the present application.

In some embodiments, optionally, referring to FIG. 7, which is a flowchart of calculating a third height difference provided by an embodiment of the present application. When calculating and judging whether the third height difference meets the preset standard, the following steps can be performed:

In step S701, for a kth first sampling position and a corresponding second sampling position, a third height difference between the first sample data and the second sample data is calculated;

An initial value of k is 1. k is a serial number used to represent the first sampling position, and is used to distinguish different first sampling positions. For example, in the case where N first sampling positions exist, numbers from 1 to N may be set as the serial numbers of the first sampling positions.

The "corresponding second sampling position" refers to a second sampling position that is provided correspondingly with reference to the first sampling position, and may be, for example, a second sampling position having the same y-axis coordinate as the first sampling position.

In step S702, it is determined whether k is equal to N; if it is, step S703 is executed; if it isn't, it is enabled k=k+1 and step S701 is returned to.

By comparing the size relationship between k and N, it can be determined whether all the first sampling positions have been traversed. In the case of not being completely traversed, the detection process of the third height difference between a next first sampling position and a corresponding second sampling position can be repeated by adding 1 to the serial number k.

In step S703, a maximum value among N third height differences is output.

After the height difference between each group of first sampling position and second sampling position is obtained from calculation, the maximum value among the N third height differences can be determined in any suitable way, and this maximum value can be used as the height difference between the first part and the second part.

In step S704, it is determined whether the maximum value of the third height difference output in step S703 exceeds a preset threshold. If it does, step S705 is executed; if it does not, step S706 is executed.

The preset threshold can be set by technicians according to the needs of the actual situation, so as to ensure that the height difference between the first part and the second part meets the requirements of the subsequent process.

In step S705, it is determined that the third height difference fails to meet the preset detection criterion.

In the case where the height difference is too large, it means that the part to be detected composed of the first part and the second part is unqualified in such condition.

In step S706, it is determined that the third height difference satisfies a preset detection criterion.

When all the first sampling positions have been traversed for detection, and none of the positions having the third height difference exceeding the threshold, it can be determined that the third height difference between the first part and the second part meets the preset detection criterion in such condition.

One of the advantages of embodiments of the present application is as follows: by sequentially detecting the third height difference at multiple positions to determine whether the detection criterion is met, more accurate detection results can be provided.

Figure 8:
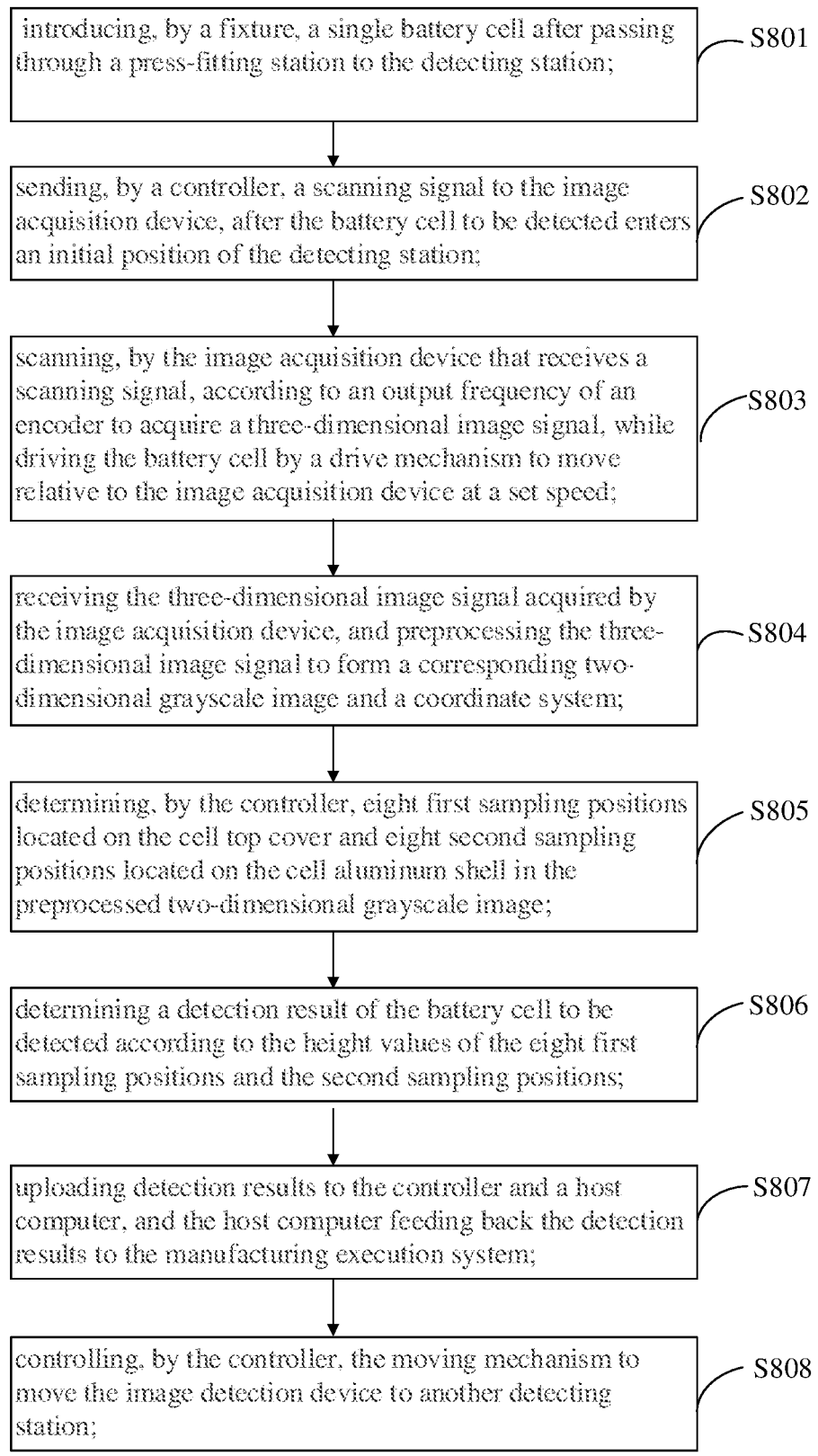
FIG. 8 is a flowchart of a method for detecting a cell top cover and a cell aluminum shell based on machine vision according to some embodiments of the present application.
Figure 9:
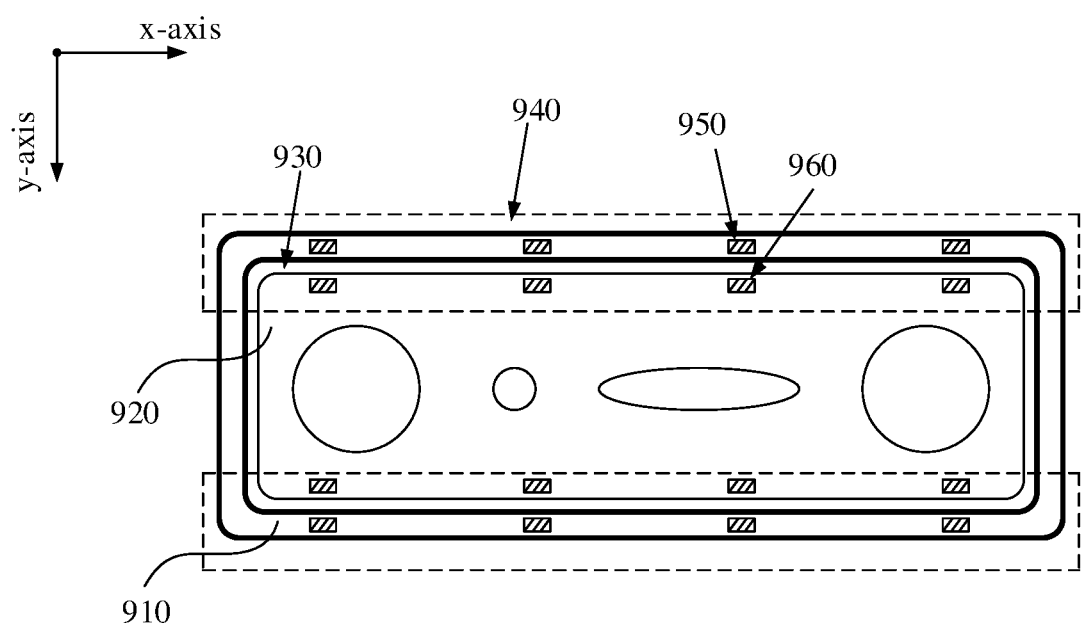
FIG. 9 is a schematic diagram of a part to be detected according to some embodiments of the present application, showing the cell top cover and the cell aluminum shell that is under detection in FIG. 8.

In some embodiments, optionally, referring to FIG. 8 and FIG. 9, in which, FIG. 8 is a flowchart of a height difference detection method provided by an embodiment of the present application, and FIG. 9 is a schematic diagram of a battery cell after a press-fitting process as a part to be detected provided by embodiments of the present application. The height difference detection method includes the following steps:

In step S801, a single battery cell after passing through a press-fitting station is introduced by a fixture to the detecting station.

Referring to FIG. 9, the battery cell includes: a cell aluminum shell 910 enclosing at a periphery and presenting a long rectangle and having two symmetrical sides, and a cell top cover 920 which is located with the cell aluminum shell and has a similar outline to the cell aluminum shell. A gap 930 is arranged between the cell aluminum shell and the cell top cover, and the cell aluminum shell and the cell top cover can be welded together by means of laser welding or the like.

In step S802, after the battery cell to be detected enters an initial position of the detecting station, a controller sends a scanning signal to the image acquisition device.

The controller may specifically use any suitable type of sensor (such as an infrared sensor) to determine whether the battery cell has entered the initial position of the detecting station. The controller may be a programmable logic controller (PLC) or any other suitable type of electronic processing device.

In step S803, while the battery cell is driven by a drive mechanism to move relative to the image acquisition device at a set speed, the image acquisition device that receives a scanning signal scans according to an output frequency of an encoder to acquire a three-dimensional image signal.

The battery cell entering the detecting station can be driven by a drive mechanism, such as a motor, to move relative to the line laser sensors at a set speed. The encoder is a part that feeds back the relative transfer speed of the battery cell to be detected. Thus, the line laser sensors can scan and obtain the three-dimensional image signals of the battery cell according to the output frequency of the encoder, using a scanning frequency that is adapted to the moving speed of the battery cell.

In some embodiments, continuing referring to FIG. 9, the line laser sensors can be arranged in pairs, so as to form two shooting regions along two symmetric long sides that covering both the cell aluminum shell 910 and the cell top cover 920, as indicated by dotted line boxes 940 in the figure.

In step S804, the three-dimensional image signal acquired by the image acquisition device is received, and the three-dimensional image signal is preprocessed to form a corresponding two-dimensional grayscale image and a coordinate system.

The above-mentioned preprocessing operation may be executed by calling one or more algorithms in a corresponding image software system. In some embodiments, a coordinate system can be established according to the positional relationship between the long side and the short side of the cell aluminum shell, so as to facilitate subsequent calculation and operation.

For example, the long side and short side of the cell aluminum shell can be obtained, and then the intersection point between the long side and the short side is used as the positioning point of the coordinate system, and an rotation angle between the long side and the short side relative to the coordinate system is used as the reference angle, so that a coordinate system in which the y-axis of the coordinate system is parallel to the long side and the x-axis of the coordinate system is parallel to the short side is established.

In step S805, the controller determines eight first sampling positions located on the cell top cover and eight second sampling positions located on the cell aluminum shell in the preprocessed two-dimensional grayscale image.

In this embodiment, setting eight sampling positions is taken as an example to make a statement. The eight first sampling positions 950 in FIG. 9 are uniformly distributed on the two long sides of the cell aluminum shell. Correspondingly, the eight second sampling positions 960 are aligned with the eight first sampling positions and are located in the region where the cell top cover is located.

In some embodiments, optionally, the image software system may determine the first sampling positions and the second sampling positions in the following manner as shown in FIG. 9 based on the coordinate system established in step S804.

First, a total length of one long side of the cell aluminum shell is determined through a caliper tool or similar image processing algorithms. Then, the total length is divided into five equal parts, and the positions of the four division points are determined. Finally, a preset offset m is taken as the x-coordinates of the four first sampling positions of one of the long sides, a preset offset n is taken as the x-coordinates of the corresponding four second sampling positions, and the y coordinates of the four division points are taken as the y coordinates of the four first sampling positions and the second sampling positions of one of the long sides.

The offset m and the offset n are both preset values, which can be determined by technicians according to the actual size of the battery cell to be detected and other related parameters, so as to ensure that the first sampling positions are located in the cell aluminum shell, and the second sampling positions are located on the cell top cover. The process of determining the first sampling positions and the second sampling positions along a long side at the symmetrical other side is the same as the above process, and will not be repeated here to avoid repetition.

In step S806, a detection result of the battery cell to be detected is determined, according to the height values of the eight first sampling positions and the second sampling positions.

The height values of the sampling positions can be calculated and obtained based on the three-dimensional data provided by the line laser sensors by calling the relevant algorithm by the image software system. In some embodiments, the height values of a certain sampling positions may be the average height within a region formed by expanding outward for a certain distance from the coordinate point of the sampling position as the center. Such a method is conducive to improving the accuracy of the height values of the sampling positions and avoiding interference.

The above detection results may include whether the flatness of the cell top cover, the flatness of the cell aluminum shell, and the height difference between the cell top cover and the cell aluminum shell meet the preset standards. In some embodiments, the flatness of the cell top cover itself may be represented by the difference between the maximum value and the minimum value among the height values of the eight first sampling positions. The flatness of the cell aluminum shell itself can be determined by the difference between the maximum value and the minimum value among the height values of the eight second sampling positions. In other words, when judging the flatness of the cell top cover and the cell aluminum shell themselves, the height difference between the highest position and the lowest position among the sampling positions on a long side of a certain side is used as the judgment criterion.

In some other embodiments, whether the height difference between the cell top cover and the cell aluminum shell meets the preset detection criterion is judged by the height difference between each group of a first sampling position and the corresponding second sampling position. In this embodiment, the first sampling position and the corresponding second sampling position having the same y-axis coordinate are referred to as a group.

The image processing software system can only determine that the height difference between the cell aluminum shell and the cell top cover meets the requirements when the height differences of all eight groups do not exceed the preset threshold. However, once the height difference of any group of sampling positions exceeds the preset threshold, it is indicated that the height difference between the cell top cover and the cell aluminum shell cannot satisfy the preset detection criterion.

In some embodiments, optionally, the image processing software system can realize the calculation of the height difference between the cell aluminum shell and the cell top cover and detect whether such height difference exceeds a preset threshold by creating an array queue. For example, four objects h1, h2, h3, and h4 are respectively set. These four objects may in turn receive the height difference between each group of sampling positions, such operation is traversed to obtain a maximum value as the height difference between the cell aluminum shell and the cell top cover, and it is judged whether such height difference exceeds a limit.

In step S807, detection results are uploaded to the controller and a host computer, and the host computer feeds back the detection results to the manufacturing execution system (MES).

In the case where detect results shows that any one of the flatness of the battery top cover and the flatness of the cell aluminum shell themselves, and the height difference between the cell top cover and the cell aluminum shell fails to meet the detection criterion, it can be determined as unqualified. The image information corresponding to these unqualified battery cells to be detected can be stored in a specific path for storing abnormal and unknown images, so as to facilitate coordination and communication between various departments in the overall production process.

In some embodiments, in the image information corresponding to the battery cell to be detected, different colors may be used to indicate the height of a certain position region. For example, the height can be divided into four different height ranges, and the different height ranges correspond to four different colors of red, green, blue, and yellow. In the case processing the image information, the corresponding color is used to indicate according to the height of the position region. Such a method can intuitively display the image information to acknowledge or know the height information between different portions in the part to be detected.

In step S808, the controller controls the moving mechanism to move the image detection device to another detecting station.

After completing the detection of the battery cell at one of the detecting stations, the controller can drive the image detection device to move to another detecting station for next detection operation.

One of the advantages of embodiments of the present application is as follows: by selecting data at suitable sampling positions in the provided three-dimensional image for analysis, continuous sampling can be supported without stopping at each sampling position, thereby improving the detection speed. Moreover, when detecting the battery cells to be detected, three different height differences are used to judge whether the parts to be detected are qualified, which can effectively avoid missed detection caused by the tilted placement of the cell aluminum shell and the cell top cover.

Figure 10:
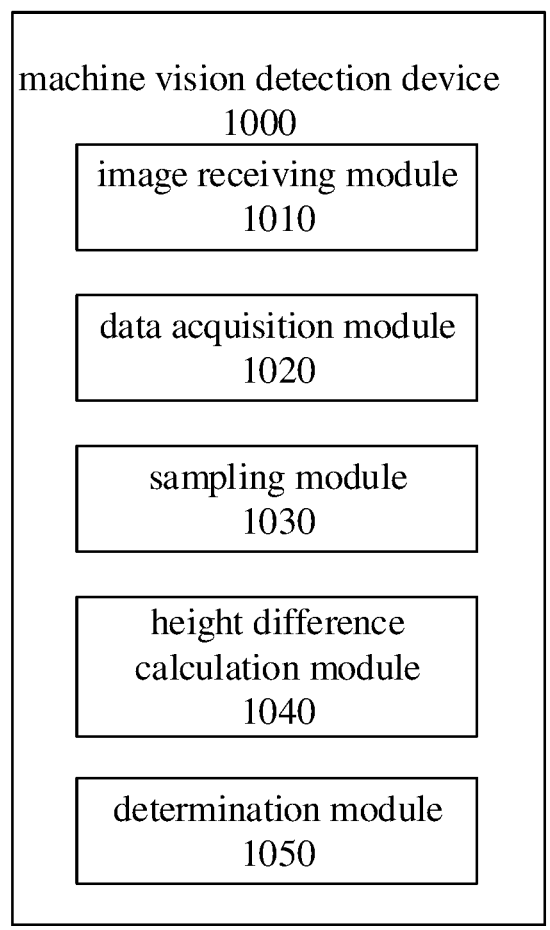
FIG. 10 is a schematic diagram of a machine vision detection device according to some embodiments of the present application.

According to some embodiments of the present application, referring to FIG. 10, which is a machine vision detection device according to an embodiment of the present application. The machine vision detection device 1000 includes: an image receiving module 1010, a data acquisition module 1020, a sampling module 1030, a height difference calculation module 1040, and a determination module 1050.

The image receiving module 1010 is configured for receiving a three-dimensional image of a part to be detected comprising a first part and a second part. The sampling module 1020 is configured for determining a plurality of sampling positions that satisfy sampling conditions. The data acquisition module 1030 is configured for acquiring first sample data of the three-dimensional image of the first part at sampling positions and second sample data of the three-dimensional image of the second part at the sampling positions. The height difference calculation module 1040 is configured for calculating a first height difference between a plurality of first sample data, a second height difference between a plurality of second sample data, and a third height difference between the first sample data and the second sample data. The determination module 1050 is configured for determining that the part to be detected is unqualified when any one of the first height difference, the second height difference, and the third height difference fails to meet a preset detection criterion.

In operation, the height difference calculation module 1040 selects the first sample data and the second template data in the sampling positions for calculation based on the sampling positions determined by the sampling module 1020, to obtain the first height difference, the second height difference, and third height difference. The determination module 1050 respectively compares the first height difference, the second height difference, and third height difference with the corresponding detection criteria, and outputs the detection result regarding whether the detection component is qualified or not.

One of the advantages of the embodiment of the present application is as follows: when detecting the part to be detected, three different height differences are used to determine whether the part to be detected is qualified, which can effectively avoid the missed detection caused by inclined placement of the first part and the second part. Moreover, by selecting data at suitable sampling positions in the provided three-dimensional image for analysis, continuous sampling can be supported without stopping at each sampling position, thereby improving the detection speed.

Figure 11:
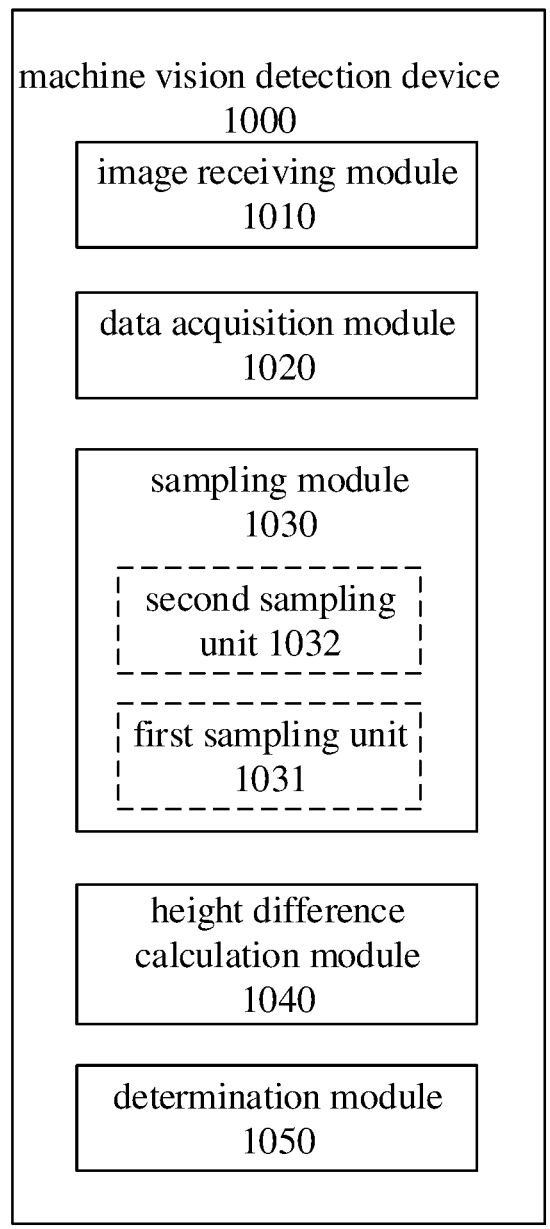
FIG. 11 is a schematic diagram of a machine vision detection device according to other embodiments of the present application.

According to some embodiments of the present application, optionally, referring to FIG. 11, the sampling module 1030 may specifically include: a first sampling unit 1031 and a second sampling unit 1032.

The first sampling unit 1031 is configured for setting a plurality of first sampling positions uniformly distributed on the first part. The second sampling unit 1032 is configured for setting a plurality of second sampling positions uniformly distributed on the second part. Such a way of setting the sampling positions with a uniform distribution can ensure the reliability of the sampling data, and can make the first, second and third height differences obtained through detection more representative.

According to some embodiments of the present application, optionally, when the first part is in the shape of a flat strip, including a long side extending along the length direction and a short side extending along the width direction, the first sampling unit 1031 is specifically configured for: setting a plurality of first sampling positions that equally divide the long side of the first part. In this way, when the first part is in the shape of a strip, uniformly distributed sampling positions can be set on the long side having a longer length to ensure the reliability of the sampling result.

According to some embodiments of the present application, optionally, when the first part comprises: a pair of long sides that are symmetrical along an axis, the axis being parallel to the length direction, and the second part is located inside an inner space enclosed by the first part to leave a gap between the first part and the second part; the first sampling unit 1031 is specifically configured for setting N first sampling positions along each long side, so that the long side of the first part is equally divided into N+1 portions, where N is a positive integer. The second sampling unit 1032 is specifically configured for setting corresponding second sampling positions on the second part along the width direction, with a preset distance spaced from the plurality of first sampling positions. Such a design can help to obtain a more accurate third height difference when the second part has an outline similar to that of the first part and is surrounded by the first part.

According to some embodiments of the present application, optionally, continuing referring to FIG. 11, the machine vision detection device further includes: an image preprocessing module 1060.

The image preprocessing module 1060 is configured for converting the three-dimensional image into a grayscale image; and generating a coordinate system of the grayscale image according to a position and an inclination angle of the first part in the three-dimensional image. In this way, a suitable coordinate system can be generated for the image information, and the tilted position of the first part can be corrected, so as to provide convenience for subsequent image processing operations.

According to some embodiments of the present application, optionally, when a y-axis of the coordinate system established by the image preprocessing module 1060 is parallel to the long side of the first part, and an x-axis of the coordinate system is parallel to the short side of the first part, the firsts sampling unit 1031 is specifically configured for: determining N division points that equally divide the long side of the first part into N+1 portions; taking m as an x-axis coordinate of each of the N first sampling positions; and taking y-axis coordinates of the N division points as y-axis coordinates of the N first sampling positions, respectively. The second sampling unit 1032 is specifically configured for: taking n as an x-axis coordinate of each of the N second sampling positions; and taking the y-axis coordinates of the first sampling positions as y-axis coordinates of corresponding second sampling positions.

m is a value set according to the size of the first part; and n is a value set according to the size of the second part, to ensure that the first sampling position is located in the region where the first part is located, and the second sampling position is located in the region where the second part is located. Such an arrangement can quickly determine sampling positions uniformly distributed on the first part and the second part.

According to some embodiments of the present application, optionally, when calculating the third height difference, the height difference calculation module 1040 is specifically configured for: for each of the plurality of first sampling positions and a corresponding second sampling position, calculating a third height difference between the first sample data and the second sample data. The determination module 1050 is specifically configured for: determining that the third height difference fails to satisfy a preset detection criterion when the maximum value among the plurality of third height differences exceeds a preset threshold.

Such a design compares the height difference of each group of corresponding sampling positions with the preset detection criterion in turn, which can well avoid measurement interference and provide more reliable detection results.

It should be noted that in embodiments of the present application, functional modules of the machine vision detection device are divided according to the method steps to be executed. In some embodiments, one or more functional modules (such as the image receiving module, the data acquisition module, the sampling module, the height difference calculation module, and the determination module) can be divided into more functional modules to perform corresponding method steps. In some other embodiments, one or more functional modules in the power exchange device of the embodiments of the present application may also be integrated into fewer functional modules to perform corresponding method steps.

Figure 12:
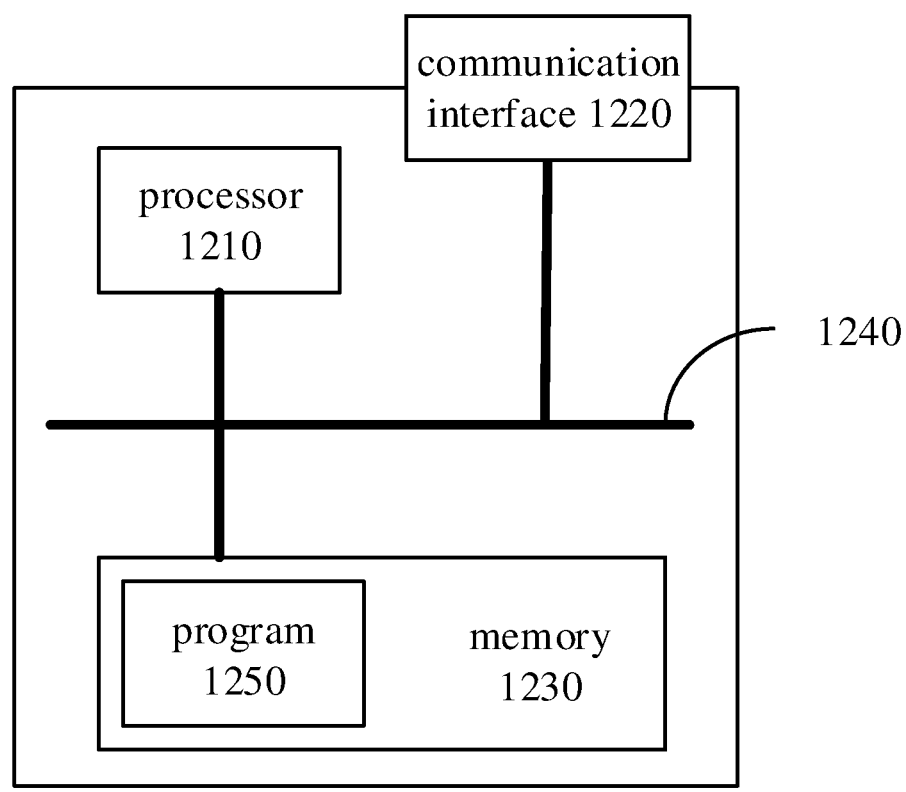
FIG. 12 is a schematic diagram of an electronic device according to some embodiments of the present application.

According to some embodiments of the present application, referring to FIG. 12, which is a schematic structural diagram of an electronic device provided by an embodiment of the present application. The electronic device may be a first controller, a second controller, or any other suitable type of electronic computing platform configured for executing the above image software system, specific implementation thereof is not limited here.

As shown in FIG. 12, the electronic device may include: a processor 1210, a communication interface 1220, a memory 1230, and communication buses 1240.

The processor 1210, the communication interface 1220, and the memory 1230 communicate with each other through the communication buses 1240. The communication interface 1220 is configured for communication connection with other devices (such as the image acquisition device). The processor 1210 is configured to call the program 1250 to execute one or more method steps in the machine vision detection method in the above embodiments or realize one or more functional modules in the machine vision detection device in the above embodiments. Specifically, the program 1250 may include program codes or computer operation instructions.

In this embodiment, according to the type of hardware configured, the processor 1210 may be central processing units, other general-purpose processors, digital signal processors, application-specific integrated circuits, field-programmable gate arrays or other programmable logic devices, discrete gate or transistor logic devices, discrete hardware components, and the like.

The memory 1230 is configured to store the programs 1250. The memory 1230 may include a high-speed RAM memory, and may further include a non-transitory memory, such as at least one disk memory.

Embodiments of the present application further provide a computer-readable storage medium. The computer-readable storage medium may be a non-transitory computer-readable storage medium. The computer readable storage medium stores computer programs.

When the computer program is executed by the processor, one or more method steps in the machine vision detection method in the above embodiments are realized or one or more functional modules in the machine vision detection device in the above embodiments are realized. A complete computer program product is embodied on one or more computer-readable storage media (including but not limited to, disk storages, CD-ROMs, optical storages, and the like) containing the computer programs disclosed in the embodiments of the present application.

Finally, it should be noted that: the above embodiments are only used to illustrate the technical solutions of the present application, and are not intended to limit the present application. Although the application has been described in detail with reference to the foregoing embodiments, those skilled in the art should understand that: it is still possible to modify the technical solutions described in the foregoing embodiments, or perform equivalent replacements for some or all of the technical features; and these modifications or replacements do not make the essence of the corresponding technical solutions deviate from the technical solutions of the various embodiments of the application, but should be covered by the scope of the claims and description of the present application. In particular, as long as there is no structural conflict, the technical features mentioned in the various embodiments can be combined in any manner. The present application is not limited to the specific embodiments disclosed herein, but includes all technical solutions falling within the scope of the claims.

What is claimed is:

1. A machine vision detection method, comprising:
    receiving a three-dimensional image of a part to be detected comprising a cell aluminum shell and a cell top cover of a battery;
    determining a plurality of sampling positions that satisfy sampling conditions;
    acquiring first sample data of the three-dimensional image of the cell aluminum shell at the sampling positions and second sample data of the three-dimensional image of the cell top cover at the sampling positions;
calculating a first height difference between a plurality of first sample data and a second height difference between a plurality of second sample data;
calculating a third height difference between the first sample data and the second sample data; and
determining that the part to be detected is unqualified when any one of the first height difference, the second height difference, and the third height difference fails to meet a preset detection criterion.

2. The method according to claim 1, wherein determining the plurality of sampling positions that satisfy sampling conditions specifically comprises:
setting a plurality of first sampling positions uniformly distributed on the cell aluminum shell; and
setting a plurality of second sampling positions uniformly distributed on the cell top cover.

3. The method according to claim 2, wherein:
the cell aluminum shell comprises a long side extending along a length direction and a short side extending along a width direction;
setting the plurality of first sampling positions uniformly distributed on the cell aluminum shell specifically comprises:
 setting a plurality of first sampling positions that equally divide the long side of the cell aluminum shell.

4. The method according to claim 3, wherein:
the cell aluminum shell further comprises a pair of long sides that are symmetrical along an axis, the axis being parallel to the length direction;
the cell top cover is located inside an inner space enclosed by the cell aluminum shell to leave a gap between the cell aluminum shell and the cell top cover;
setting the plurality of first sampling positions that equally divide the long side of the cell aluminum shell specifically comprises:
 setting N first sampling positions along each long side, so that the long side of the cell aluminum shell is equally divided into N+1 portions, wherein N is a positive integer; and
setting the plurality of second sampling positions uniformly distributed on the cell top cover specifically comprises:
 setting corresponding second sampling positions on the cell top cover along the width direction, with a preset distance spaced from the plurality of first sampling positions.

5. The method according to claim 4, further comprising:
converting the three-dimensional image into a grayscale image; and
generating a coordinate system of the grayscale image according to a position and an inclination angle of the cell aluminum shell in the three-dimensional image.

6. The method according to claim 5, wherein:
a y-axis of the coordinate system is parallel to the long side of the cell aluminum shell, and an x-axis of the coordinate system is parallel to the short side of the cell aluminum shell;
setting the N first sampling positions along each long side specifically comprises:
 determining N division points that equally divide the long side of the cell aluminum shell into N+1 portions;
 taking m as an x-axis coordinate of each of the N first sampling positions; and
 taking y-axis coordinates of the N division points as y-axis coordinates of the N first sampling positions, respectively, wherein m is a numerical value set according to the size of the cell aluminum shell; and
setting corresponding second sampling positions on the cell top cover along the width direction, with the preset distance spaced from the plurality of first sampling positions specifically comprises:
 taking n as an x-axis coordinate of each of the N second sampling positions; and
 taking the y-axis coordinates of the first sampling positions as y-axis coordinates of corresponding second sampling positions, wherein n is a value set according to the size of the cell top cover.

7. The method according to claim 2, wherein calculating the third height difference between the first sample data and the second sample data specifically comprises:
for each of the plurality of first sampling positions and a corresponding second sampling position, calculating a third height difference between the first sample data and the second sample data;
determining a maximum value among a plurality of third height differences; and
determining that the third height difference fails to satisfy a preset detection criterion when the maximum value among the plurality of third height differences exceeds a preset threshold.

8. A machine vision detection system, comprising:
an image acquisition device, configured for acquiring a three-dimensional image of at least a portion of a part to be detected;
a detecting station, configured for accommodating the part to be detected; and
a first controller, in communication connection with the image acquisition device and configured for executing the machine vision detection method according to claim 1.

9. The system of claim 8, further comprising:
a second controller, the second controller storing a plurality of configuration information recording a target spacing and a target height, with each configuration information corresponding to at least one part to be detected; and
the image acquisition device comprising: two line laser sensors, a sensor support, a height adjustment module, and a spacing adjustment module;
wherein:
 the two line laser sensors are respectively arranged on two sides of the sensor support;
 the height adjustment module is arranged on the sensor support and configured for adjusting heights of the two line laser sensors;
 the spacing adjustment module is arranged on the sensor support and configured for adjusting a spacing between the two line laser sensors; and
 the second controller is configured for controlling the height adjustment module and the spacing adjustment module to enable the two line laser sensors to reach the target spacing and/or the target height.

10. The system according to claim 9, wherein:
the detecting station is one of two detecting stations; and
the image acquisition device further comprises a moving mechanism, configured for driving the sensor support to reciprocate between the two detecting stations.

11. An electronic device, comprising:
a processor; and a memory in communication connection with the processor, wherein the memory stores computer program instructions, which, when being called by the processor, cause the processor to perform the machine vision detection method according to claim 1.

12. A non-transitory computer storage medium, wherein the non-transitory computer storage medium stores computer program instructions, which, when being called by the processor, cause the processor to perform the machine vision detection method according to claim 1.

13. A machine vision detection device, comprising:
an image receiving module, configured for receiving a three-dimensional image of a part to be detected comprising a cell aluminum shell and a cell top cover of a battery;
a sampling module, configured for determining a plurality of sampling positions that satisfy sampling conditions;
a data acquisition module, configured for acquiring first sample data of the three-dimensional image of the cell aluminum shell at sampling positions and second sample data of the three-dimensional image of the cell top cover at the sampling positions;
a height difference calculation module, configured for calculating a first height difference between a plurality of first sample data, a second height difference between a plurality of second sample data, and a third height difference between the first sample data and the second sample data; and
a determination module, configured for determining that the part to be detected is unqualified when any one of the first height difference, the second height difference, and the third height difference fails to meet a preset detection criterion.

14. The device according to claim 13, wherein the sampling module comprises:
a first sampling unit, configured for setting a plurality of first sampling positions uniformly distributed on the cell aluminum shell; and
a second sampling unit, configured for setting a plurality of second sampling positions uniformly distributed on the cell top cover.

15. The device according to claim 14, wherein:
the cell aluminum shell comprises a long side extending along a length direction and a short side extending along a width direction; and
the first sampling unit is specifically configured for setting a plurality of first sampling positions that equally divide the long side of the cell aluminum shell.

16. The device according to claim 15, wherein:
the cell aluminum shell further comprises a pair of long sides that are symmetrical along an axis, the axis being parallel to the length direction; the cell top cover is located inside an inner space enclosed by the cell aluminum shell to leave a gap between the cell aluminum shell and the cell top cover;

the first sampling unit is specifically configured for setting N first sampling positions along each long side, so that the long side of the cell aluminum shell is equally divided into N+1 portions, wherein N is a positive integer; and
the second sampling unit is specifically configured for setting corresponding second sampling positions on the cell top cover along the width direction, with a preset distance spaced from the plurality of first sampling positions.

17. The device according to claim 16, further comprising:
an image preprocessing module, configured for converting the three-dimensional image into a grayscale image; and generating a coordinate system of the grayscale image according to a position and an inclination angle of the cell aluminum shell in the three-dimensional image.

18. The device according to claim 15, wherein:
a y-axis of the coordinate system is parallel to the long side of the cell aluminum shell, and an x-axis of the coordinate system is parallel to the short side of the cell aluminum shell;
the first sampling unit is specifically configured for:
determining N division points that equally divide the long side of the cell aluminum shell into N+1 portions;
taking m as an x-axis coordinate of each of the N first sampling positions; and
taking y-axis coordinates of the N division points as y-axis coordinates of the N first sampling positions, respectively, wherein, m is a numerical value set according to the size of the cell aluminum shell; and
the second sampling unit is specifically configured for taking n as an x-axis coordinate of each of the N second sampling positions; and taking the y-axis coordinates of the first sampling positions as y-axis coordinates of corresponding second sampling positions, wherein n is a value set according to the size of the cell top cover.

19. The device according to claim 13, wherein:
the height difference calculation module is specifically configured for:
for each of the plurality of first sampling positions and a corresponding second sampling position, calculating a third height difference between the first sample data and the second sample data; and
determining a maximum value among a plurality of third height differences; and
the determination module is specifically configured for determining that the third height difference fails to satisfy a preset detection criterion when the maximum value among the plurality of third height differences exceeds a preset threshold.

* * * * *